US008682506B2

(12) United States Patent
Marton et al.

(10) Patent No.: US 8,682,506 B2
(45) Date of Patent: Mar. 25, 2014

(54) AUTOMATIC ATTITUDE CONTROL OF ROTARY WING AIRCRAFTS

(71) Applicant: Prox Dynamics AS, Hvalstad (NO)

(72) Inventors: Trygve Frederik Marton, Slependen (NO); Geir Morten Egeberg Mellem, Tonsberg (NO); Pal Hagh Sandberg, Hvalstad (NO); Petter Muren, Slependen (NO); Dag Henning Paulsen, Voyenenga (NO)

( * ) Notice: Subject to any disclaimer, the term of this patent is extended or adjusted under 35 U.S.C. 154(b) by 0 days.

(21) Appl. No.: 13/778,212

(22) Filed: Feb. 27, 2013

(65) Prior Publication Data

US 2013/0306787 A1   Nov. 21, 2013

Related U.S. Application Data

(60) Provisional application No. 61/613,720, filed on Mar. 21, 2012.

(30) Foreign Application Priority Data

Mar. 22, 2012  (NO) .................................. 20120340

(51) Int. Cl.
*G05D 1/08* (2006.01)
*B64C 27/467* (2006.01)

(52) U.S. Cl.
USPC ............ 701/4; 701/14; 703/2; 244/75.1; 244/99.2

(58) Field of Classification Search
USPC ............ 701/3–5, 14; 244/75.1, 99.2; 703/2
See application file for complete search history.

(56) References Cited

U.S. PATENT DOCUMENTS

| 4,648,797 A | 3/1987 | Martin |
| 4,834,318 A | 5/1989 | Taylor et al. |
| 5,169,090 A | 12/1992 | Wright et al. |
| 5,799,901 A * | 9/1998 | Osder .................. 244/17.13 |
| 5,850,615 A * | 12/1998 | Osder ......................... 701/4 |
| 6,751,529 B1 | 6/2004 | Fouche |
| 7,970,498 B2 | 6/2011 | Sahasrabudhe et al. |

(Continued)

FOREIGN PATENT DOCUMENTS

| EP | 1310646 A2 | 5/2003 |
| GB | 671076 A | 4/1952 |
| WO | 2005100154 A1 | 10/2005 |

OTHER PUBLICATIONS

Andrisani et al, A Non-Linear Tracker Using Attitude Measurements, IEEE Transactions on Aerospace and Electronic Systems, vol. AES-22, Iss. 5, 1986, pp. 533-539.*

(Continued)

*Primary Examiner* — Russell Frejd
(74) *Attorney, Agent, or Firm* — Christopher & Weisberg, P.A.

(57) ABSTRACT

A method and device for precise control of and controller design for aircrafts consisting of at least one spinning part and at least one non-spinning part is provided. The required torques for control of the spinning parts and for the non-spinning parts are continuously and individually calculated. All torques are combined to get the correct torque for the complete aircraft. Doing this, it's possible to continuously apply the correct torque, both correctly distributed among the roll and pitch axes (correct angle), and correct magnitude. The result is a decoupling of the roll and pitch axes, simplifying controller design to a design of two single input single output controllers, one for each axe.

16 Claims, 8 Drawing Sheets

(56) References Cited

U.S. PATENT DOCUMENTS

| | | |
|---|---|---|
| 8,000,849 B2 * | 8/2011 | Reich .......................... 701/14 |
| 8,201,771 B2 | 6/2012 | Kessler et al. |
| 2003/0135306 A1 | 7/2003 | Driscoll et al. |
| 2006/0100751 A1 | 5/2006 | Saleese-Lavergne |
| 2008/0249672 A1 | 10/2008 | Cherepinsky |

OTHER PUBLICATIONS

Norwegian Search Report dated Mar. 20, 2013 for Norwegian Application No. 20120340, filed on Mar. 22, 2012 consisting of 2 pages.

International Search Report and Written Opinion dated Sep. 5, 2013 for International Application No. PCT/EP2013/053891, International Filing Date: Feb. 27, 2013 consisting of 11-pages.

* cited by examiner

AUTOMATIC ATTITUDE CONTROL OF ROTARY WING AIRCRAFTS

CROSS-REFERENCE TO RELATED APPLICATION

This application is related to and claims priority to U.S. Provisional No. 61/613,720, filed Mar. 21, 2012, entitled AUTOMATIC ATTITUDE CONTROL OF ROTARY WING AIRCRAFT and claims priority to Norwegian patent application No. 20120340 filed Mar. 22, 2012 the entirety of which is incorporated herein by reference.

STATEMENT REGARDING FEDERALLY SPONSORED RESEARCH OR DEVELOPMENT

Not Applicable

FIELD OF THE INVENTION

The present invention relates to a method and system for providing precise automatic attitude control of rotary wing aircrafts.

BACKGROUND OF THE INVENTION

Typically, rotary wing aircrafts like helicopters are sustained by a rotor, spinning about a vertical rotor shaft, generating lift or upward thrust. In a conventional helicopter the thrust from the rotor can be controlled by changing the pitch angle 10 (or in short; the blade pitch) of the rotor blades. The blade pitch is in the field of propeller aerodynamics defined as the lateral angle between the blades and a reference plane perpendicular to the rotor shaft axis, measured perpendicular to the longitudinal axis of a rotor blade.

By collectively changing the blade pitch of all the rotor blades or by changing the angular velocity of the rotor, the helicopter can be controlled in the vertical direction. The horizontal direction of flight and the stability of the helicopter, however, are controlled by cyclically adjusting the blade pitch of individual blades. Cyclically adjusting the pitch means that the blade pitch of each rotor blade is adjusted from a maximum in a particular position of rotation to a minimum at the opposite side. This causes the lift in one part of the rotation to be larger than in other parts, whereby the rotor is tilted with respect to the reference plane. When the rotor (and helicopter) tilts like this, the initially vertical thrust also tilts, and therefore gets a horizontal component pulling the helicopter in the desired direction.

Normally, a helicopter must be actively controlled by a well trained pilot or from gyroscopic sensors and computers. The necessary means to varying and controlling the pitch angle of each blade are normally complicated, expensive and add weight to the helicopter. The blade pitch is typically controlled via a swash plate connected to servos. Because the swash plate needs to be positioned accurately with as little friction and play as possible it is complicated and expensive. On most helicopters the swash plate has a spinning part and a non-spinning part connected together with a large ball bearing. The spinning part of the swash plate is again connected to the rotor blades via a set of links and other mechanical components.

Alternative solutions employing actuators connected to rotor blade control surfaces or magnetic coil systems acting directly on a permanent magnet mounted on a rotor blade pitch arm have been tested. Control of rotary wing aircrafts has traditionally been challenging.

The rapidly spinning rotor behaves as a gyroscope and introduces precession. When a torque is applied perpendicular to the axis of rotation of a gyroscope, the resulting motion is perpendicular to both the axis of spinning and the applied force. The angular velocity of the motion is proportional to 20 the applied torque.

Under normal flying, the fuselage does behave differently, and does not introduce precession. When a torque is applied to the fuselage, the result is an angular acceleration, parallel with and proportional to the applied torque.

Controlling a rapidly spinning gyroscope alone is straightforward. The applied torque must be applied 90 degrees in advance of the required motion, and must be proportional to the required angular velocity. I.e. for a required roll motion, a pitch torque must be applied. For a pitch motion, a roll torque must be applied. The torque must be maintained for the complete duration of the motion. The angular motion will stop if the torque vanishes.

Control of a fuselage alone is similarly straightforward. The applied torque must be applied parallel to the required motion, and must be proportional to the required angular acceleration. The torque must be applied only during the acceleration and retardation phase of the motion, once an angular velocity is achieved, this velocity will remain constant if without any applied torque.

The challenge arises when the rotor is fixed to the fuselage. When fixed together, with exception of the one degree of freedom of the connecting joint, both parts must rotate in parallel, and when a torque is applied, the resulting motion arising from the torque will be somewhat between parallel (fuselage) and 90 degrees behind (rotor) the applied torque. The exact angle is dependent on the current state of the aircraft.

Prior art usually consider this angle to be constant for a rotary wing aircraft. For some aircrafts, the angle can be tuned to a working compromise. Often, 45 degrees is chosen, as this seems to give the most robust solution. Regardless of the 20 angle, any constant value will result in a heavily coupled system. Any applied torque will result in a motion both parallel as well as a motion perpendicular to the torque. When designing automatic control systems, this cross coupling will cause multiple feedback paths, making it more difficult to achieve necessary control authority and necessary stability margins. Even when stable, any motion change, regardless of being a requested motion or a correction of an undesired motion, will be achieved through multiple passes through the regulator, each correcting the error motion from the last pass. The aircraft will obtain its requested attitude (meaning roll and pitch) in an oscillating approach.

For some aircrafts, typically smaller aircraft with fast dynamics, or aircrafts with especially strict demands on control, the traditional approach does not work.

SUMMARY OF THE INVENTION

In one embodiment, the present invention provides a flight control device outputting actuator steering commands in the yaw, pitch and roll domain from an angular velocity rate control input (wi) controlling a rotary wing aircraft comprising at least one rotor and one fuselage, the flight control device comprising a rate controller deriving requested angular velocity (w) and angular acceleration (wdot) from wi and a measured velocity rate (wg), an actuator controller deriving actuator steering commands by an aerodynamic function (F2) being modeled by at least the aerodynamics of the rotary wing aircraft, comprising a torque controller device deriving required torque (T) corresponding to w and wdot by a torque function F1 being dependent of w, wdot, the inertia of the fuselage (If) and the inertia of the rotor (Ir), the torque function device being coupled between the rate controller and the actuator controller, having the outputs w and wdot from the rate controller as inputs and providing T as input to the actuator controller.

In another embodiment, the present invention also includes a method of flight control for outputting actuator steering commands in the yaw, pitch and roll domain from an angular velocity rate control input (wi) controlling a rotary wing aircraft comprising at least one rotor and one fuselage, the method deriving requested angular velocity (w) and angular acceleration (wdot) from wi and a measured velocity rate (wg), and deriving actuator commands by an aerodynamic function (F2) being modeled by at least the aerodynamics of the rotary wing aircraft dependent of the required torque (T) corresponding to w and wdot, comprising the steps of deriving T by a torque function F1 being dependent of w, wdot, the inertia of the fuselage (If) and the inertia of the rotor (Ir) and providing the derived T as input function F2.

The embodiments herein are not limited to the features and advantages mentioned above. A person skilled in the art will recognize additional features and advantages upon reading the following detailed description.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
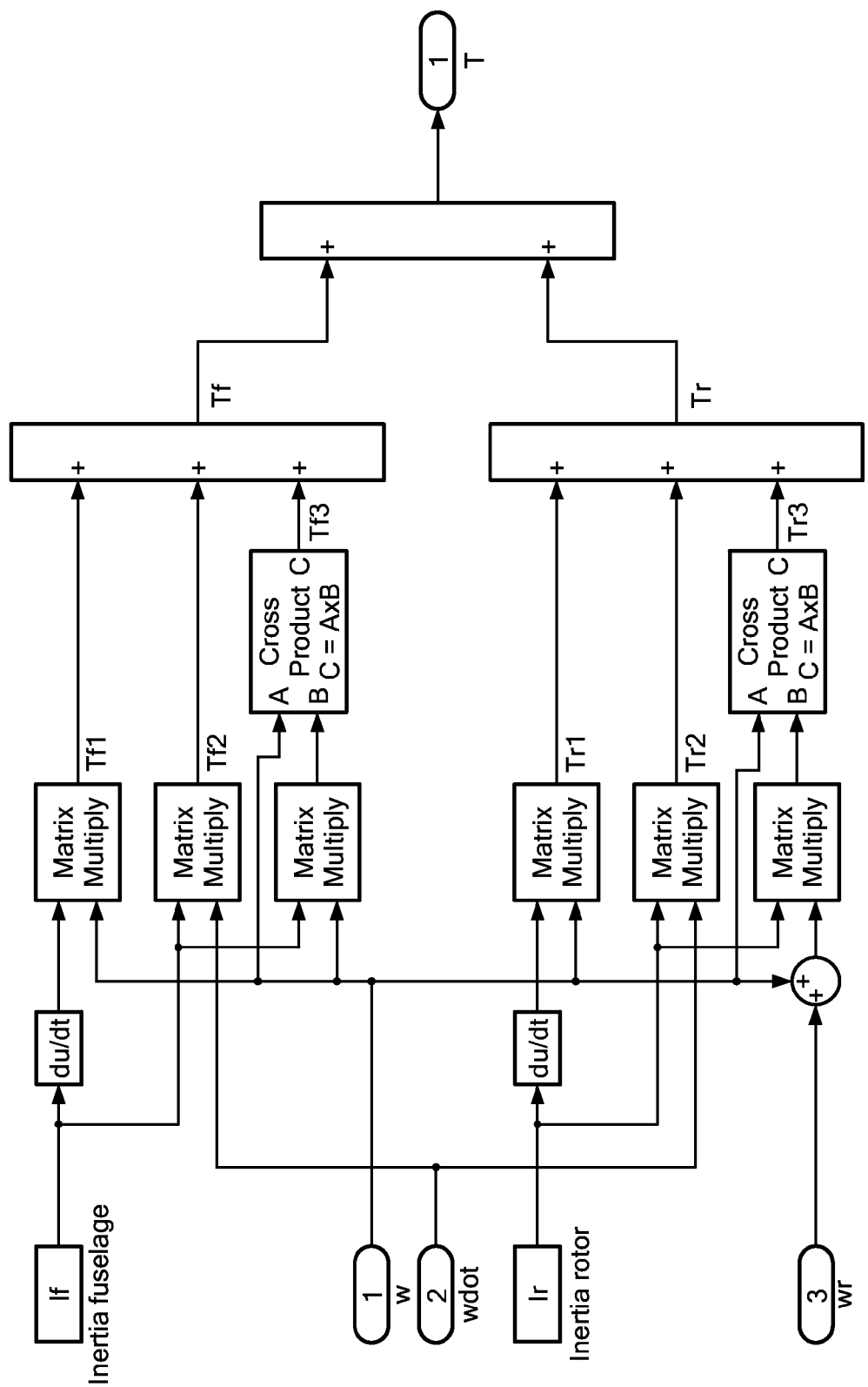
FIG. 1 shows an exemplary scheme to calculate the required torque for any requested motion constructed in accordance with the principles of the present invention.

The invention describes a method and device for precise control of and controller design for aircrafts consisting of at least one spinning part and at least one non-spinning part. Typically, but without loss of generality, the spinning part is a rotor, whereas the non-spinning part is a fuselage. The principle described can be extended to any number of spinning and non-spinning parts, making the invention applicable to traditional single rotor helicopter design as well as multi rotor designs.

The method and device is particularly suitable for UAVs, where the operator does not see the aircraft during all flight, and thus is unable to correct the attitude. However, the method is applicable also for model aircrafts and full size aircrafts.

The inventions principle is to continuously and individually calculate the required torques for control of the spinning parts and for the non-spinning parts, and combine all torques to get the correct torque for the complete aircraft. Doing this, it's possible to continuously apply the correct torque, both correctly distributed among the roll and pitch axes (correct angle), and correct magnitude. The result is a decoupling of the roll and pitch axes, simplifying controller design to a design of two single input single output controllers, one for each axe.

Before describing in detail exemplary embodiments that are in accordance with the present invention, it is noted that the embodiments reside primarily in combinations of apparatus components and processing steps related to providing precise automatic attitude control of rotary wing aircrafts. Accordingly, the method, system, and device components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

FIG. 1 shows the scheme to calculate the required torque for any requested motion. The symbol w denotes the requested aircraft or fuselage angular velocity, eventually corrected for disturbances, further explained below, while wdot denotes the requested aircraft or fuselage angular acceleration. The symbol wf denotes the actual or measured angular velocity of the aircraft or fuselage. All are 3×1 vectors, where the elements represent the roll, pitch and yaw axes. The symbol If denotes the 3×3 inertia matrix of the fuselage, whereas Ir denotes the 3×3 inertia matrix of the rotor, including all parts spinning with the rotor. Both inertia matrixes are referred to the center of gravity of the complete aircraft. The symbol wr denotes the rotor's angular velocity measured relative to the fuselage.

For simplicity, the figure and explanation assumes that the rotor is fixed to the fuselage using a single degree of freedom joint (able to spin in one rotational axe, otherwise rigidly fixed to the fuselage). For other types of joint, including joints with flexibility, the equations and schematics should be extended to reflect the characteristics of the joint.

The upper part of the figure calculates the required torque to for controlling the fuselage. The general equation for the 3×1 torque vector Tf is:

$$Tf = dIf/dt * wf + If * dw/dt + w \times (If * wf)$$

The first term of the equation corresponds to reference Tf1 in the figure. This torque is due to changing inertia of the fuselage, and the angular velocity of the fuselage. In most cases, the fuselage inertia is constant or close to constant, so this part may be neglected in an implementation.

The second term of the equation corresponds to reference Tf2 in the figure. This torque is the torque required to achieve the requested angular acceleration. It's is the dominating torque for controlling the fuselage.

The third term of the equation corresponds to reference Tf3 in the figure. This torque is the torque necessary to change the angular momentum of the fuselage. The angular momentum of a body is product of the body's moment of inertia and its angular velocity. As angular velocities for the fuselage is normally low, this term will be smaller than the second term.

The lower part of the figure calculates the required torque for controlling the rotor. Due to the spinning rotor, relative the fuselage, the general equation for the 3×1 torque vector is slightly modified:

$$Tr = dIr/dt*(w+wr) + Ir*dw/dt + w \times (Ir*(wf+wr))$$

The first term of the equation corresponds to reference Tr1 in the figure. This torque is due to changing inertia of the rotor, and the angular velocity of the fuselage. The rotor's inertia is referred to the fuselage, and when spinning, this inertia matrix may change, and thus have a time derivative not equal zero. In some cases, for example when using a rigid four bladed rotor, the time derivative equals zero, and thus this term also equals zero.

In other cases, assuming that the rotor angular velocity is much greater than the fuselage angular velocity, which normally would be the case for small UAVs, Ir could be approximated with the average inertia over one rotor rotation. In this case, the approximation would be constant, and the first term could be neglected. This approximation trick is helpful, especially in the cases where the absolute rotation angle of the rotor relative the fuselage is not known.

The second term of the equation corresponds to reference Tr2 in the figure. This torque is the torque required to achieve the requested angular acceleration. As for Tr1, exact calculation requires knowledge of the time varying rotor inertia; however, using an average inertia is a practical approximation, and the second term could also be neglected.

The third term of the equation corresponds to reference Tr3 in the figure. This torque is the torque necessary to change the angular momentum of the rotor, and equals the cross product of the fuselage's angular velocity and the angular momentum of the rotor (Ir*(wf+wr)). As already mentioned, the angular momentum of a body is product of the body's moment of inertia and its angular velocity. The angular velocity of the rotor is high, due to its spin relative the fuselage, and therefore this is the dominating torque for controlling the rotor. This is also the term that causes the precession.

The total 3×1 torque vector necessary to achieve the requested angular acceleration and angular velocity:

$$T = Tf + Tr$$

Note that FIG. 1 shows one non-spinning part (fuselage) and one spinning part (rotor), but the principle can be easily extended to any number of non-spinning and spinning parts, without loss of generality.

Figure 2:
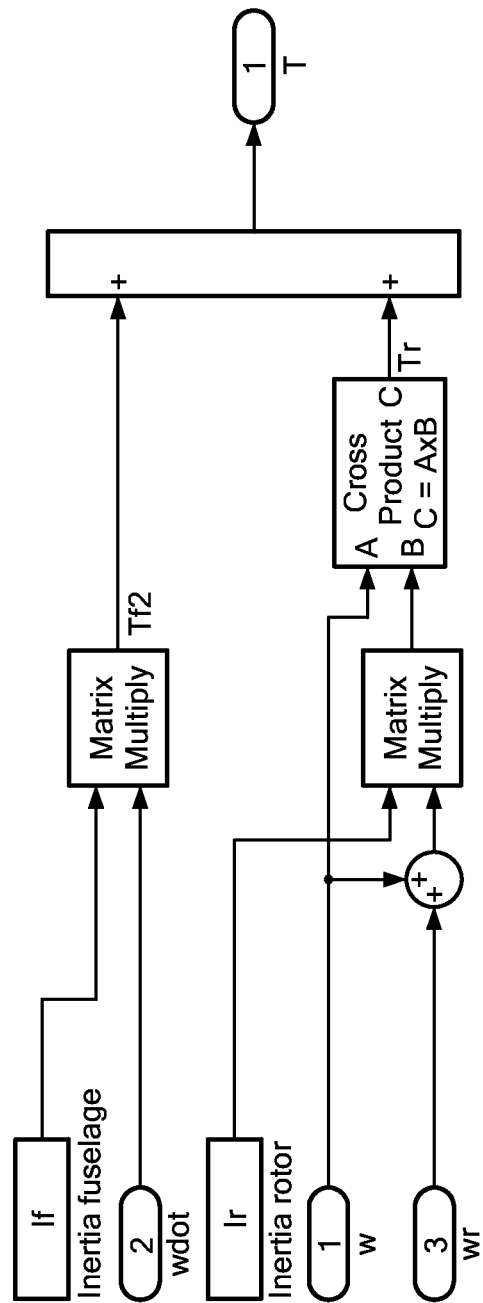
FIG. 2 shows a block diagram of one embodiment of the present invention.

In practical use for a spinning rotor fixed to a non-spinning fuselage, the two components Tf2 and Tr may be so dominant in the total torque vector necessary to achieve the requested angular acceleration and angular velocity, that the other component can be ignored. FIG. 2 shows one embodiment based on this assumption. Note that which simplifications which may be done, depends on the overall aircraft design and performance criteria.

Regardless of the simplifications chosen, the necessary 3×1 torque vector T can be expressed as a function F1 of w, wdot, wf and wr, optionally Ir and If.

$$T = F1(w, wdot, wf, wr, Ir, If)$$

Using the method, torques will be calculated so that any requested roll command will be responded with a roll movement, not coupling to pitch, and vice versa. Due to the distribution of the inertia, different torque magnitudes may be necessary to achieve roll or pitch commands; however, any control design does not have to account for this, as it is taken care of by the function F1.

Figure 3:
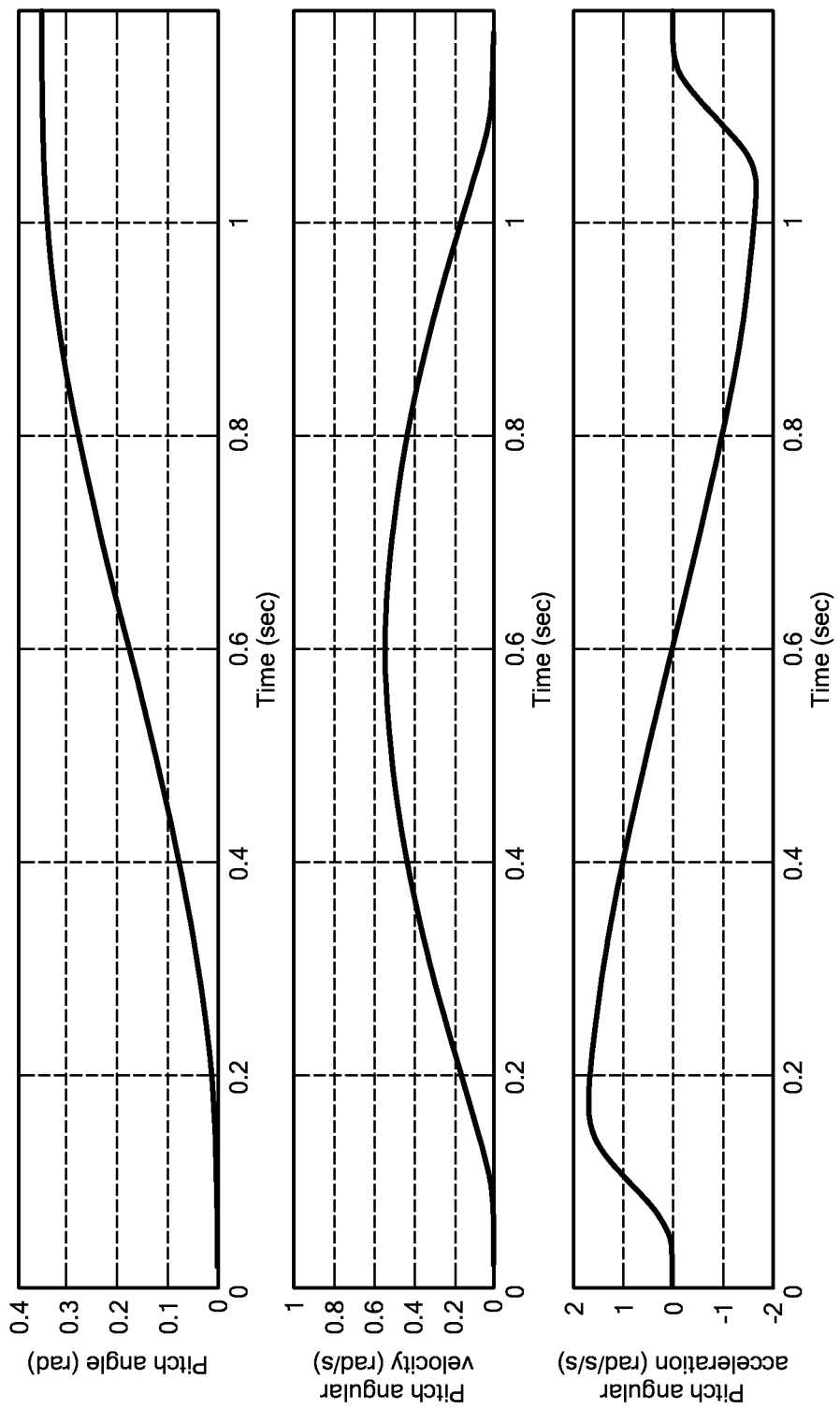
FIG. 3-5 shows the result of a pitch rotational command of a single rotor aircraft where torque is calculated utilizing one embodiment of the present invention.
Figure 4:
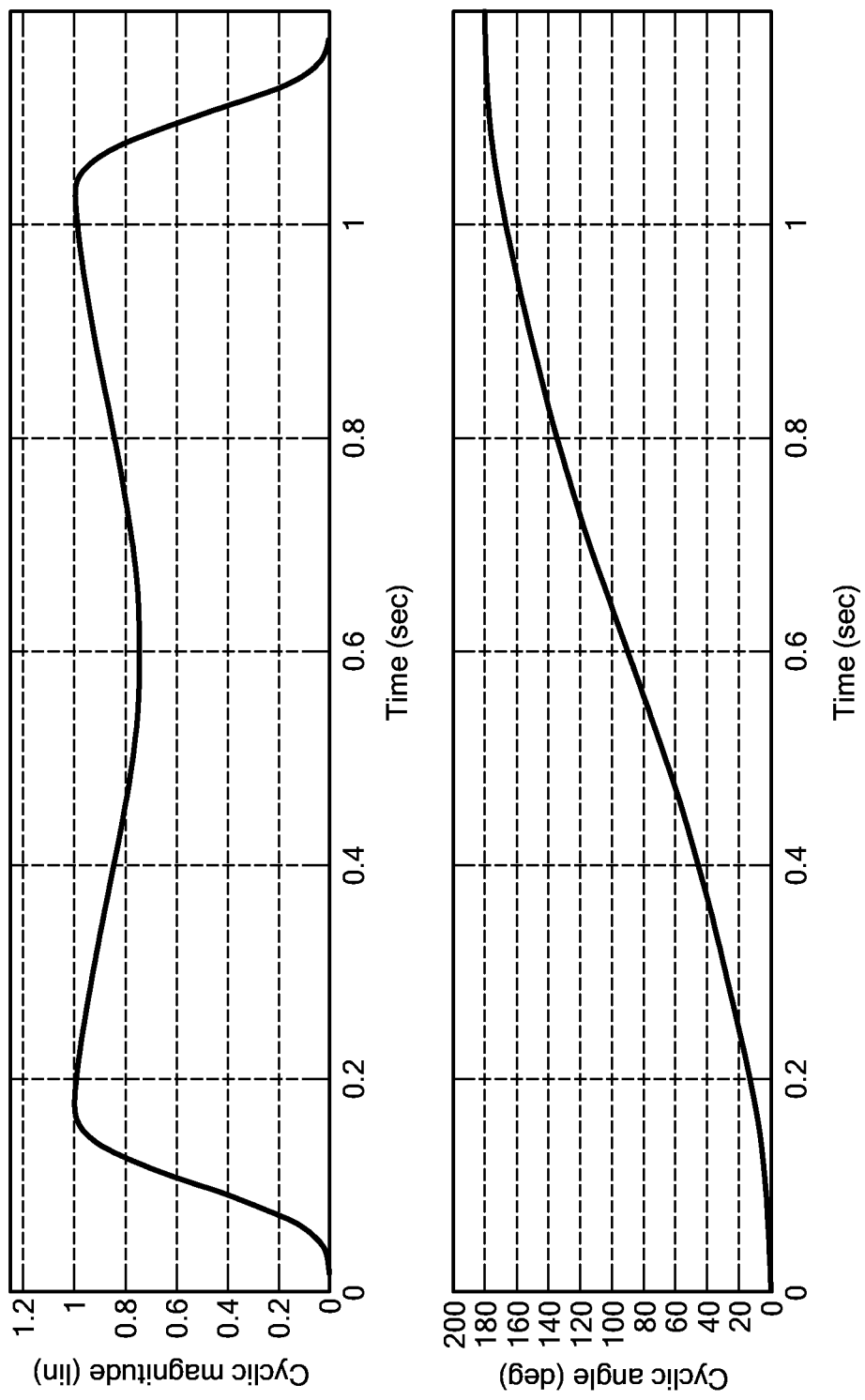
Figure 5:
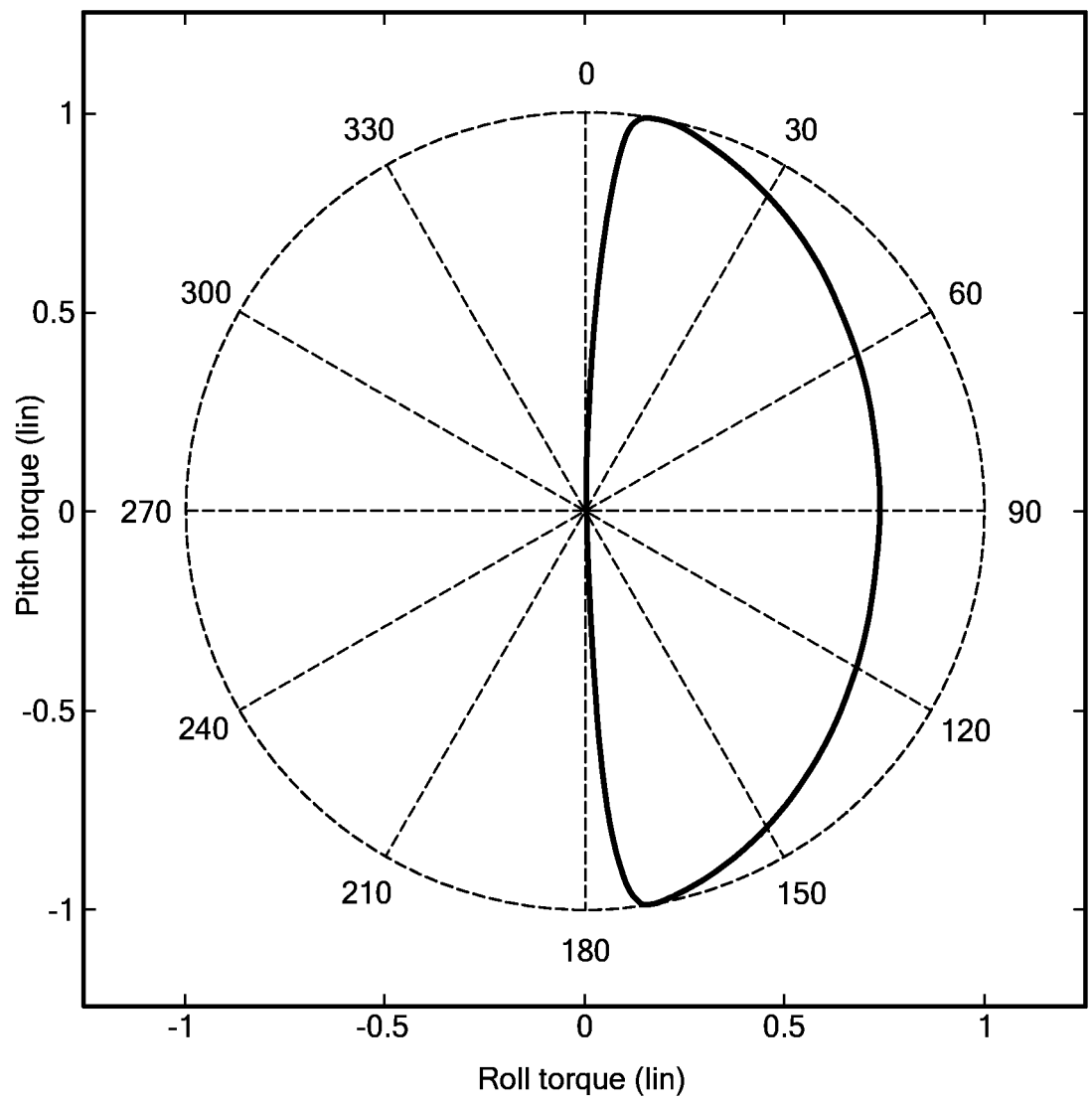

FIGS. 3 to 5 shows an example of a pitch rotational command of a single rotor aircraft, i.e. a helicopter, where torque is calculated using the described method. The tail rotor is disregarded in the example, as it usually contributes only marginally. In the example, the main rotor spins clockwise seen from above. The angles and corresponding rates follow standard euler angles defined by a right hand system.

FIG. 3 shows the pitch command, the resulting angular velocity and angular acceleration, respectively, as function of time. It is assumed constant roll and yaw angle equal zero during the command.

FIG. 4 shows the magnitude and angle of the torque calculated using the described method, as a function of time. FIG. 5 shows the pitch torque vs. the roll torque. Note that the amount of roll vs. pitch torque will depend on the fuselage's inertia, the rotor's inertia and the rotor's angular velocity. The figures shows an example, dependent on design, the ratios may be different.

As can be seen from the figures, a positive pitch command starts with a positive pitch acceleration and a positive pitch torque, i.e. a torque with angle equal zero. This torque can be achieved by increasing the lift of the rotor at 0 degrees, while reducing the lift with the same amount at 180 degrees. At the start of the rotation, there are no angular velocity, and no precession.

When the angular pitch velocity builds up, the precession needs to be handled. An additional torque, angled 90 degrees in advance of the actual movement, is necessary to change the angular momentum. This is a positive roll torque. In the middle of the rotation, the angular acceleration equals zeros, and at this point, the only necessary torque is the roll torque, however the rotation is purely a pitch rotation.

In the next phase, the rotation shall be stopped, which requires negative angular pitch acceleration, and thus a 10 negative pitch torque. When the angular velocity reduces, the necessary roll torque to change the angular momentum (maintain rotation) decreases. At the end, the rotation has stopped, and all torques are zero.

I.e., as shown in FIG. 5, a pure positive pitch rotation is achieved by applying a torque on the rotor disc following a clockwise route, starting at 0 degrees, ending at 180 degrees.

Figure 6:
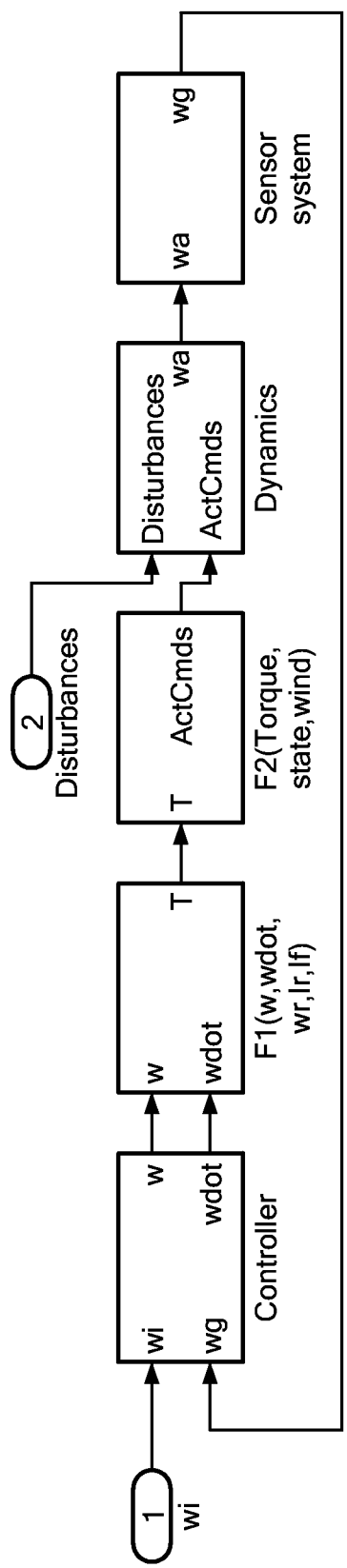
FIG. 6. shows a block diagram of an inner loop system for automatic rate control according to one embodiment of the present invention.

FIG. 6 schematically shows an inner loop system for automatic attitude rate control. The above explained decoupling function F1 inputs the requested angular velocity w and angular acceleration wdot, outputting a necessary torque T.

The torque is converted to actuator commands by the function F2. F2 will be highly dependent on the aircraft design, and involves engine dynamics, rotor design, aerodynamics etc., and will be varying with the aircrafts state (both tranlatory speed and angular velocity), wind and other environment variables. Though not discussed in further detail here, unaccurate models may reduce the amount of decoupling between the axes.

The actuator command is applied to the actual aircraft; together with applied disturbances (wind, turbulence, etc.) this cause an actual rotational rate wa, illustrated with the Dynamics block.

The sensor system, for a rate controller typically based on gyros, senses the actual rotational rates and outputs gyro readings wg representing the actual rate.

The controller uses the sensor readings wg, together with a rate control input wi, to calculate the requested angular velocities and angular acceleration. The control input wi could be a control input directly from an operator, however, in autonomous systems it will most often be defined by an outer control loop.

Figure 7:
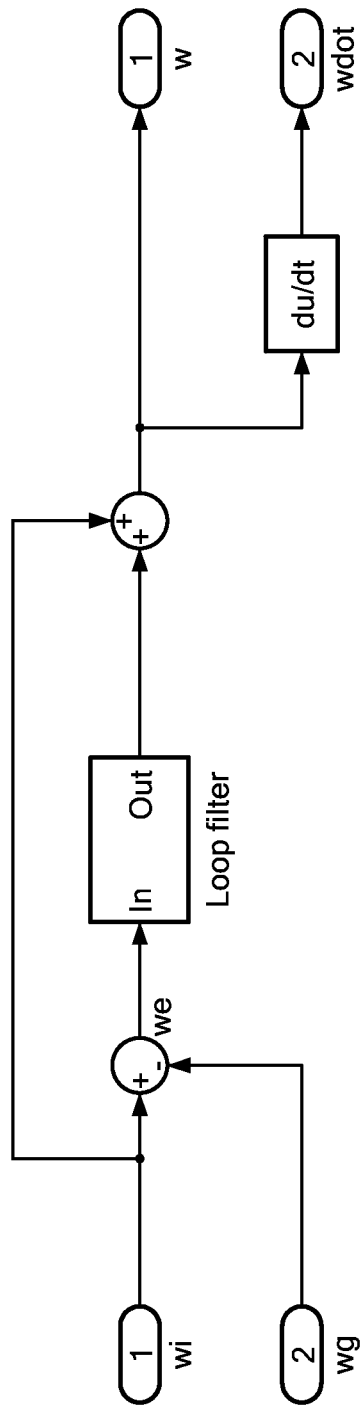
FIG. 7-8 shows block diagrams of an example of a rate controller.

FIG. 7 shows an example of a rate controller. A rate error signal we is calculated as the difference between the control input rate and the measured rate:

$$we = wi - wg$$

The error signal is filtered through a loop filter. The control rate wi is added to the filter output to obtain the requested rate w. This latter addition is helpful, as a torque is helpful to changes the angular momentum of the rotor, maintaining the rotation. I.e. a torque is applied even if the error rate signal is zero.

The requested rate w is differentiated with respect to time to obtain wdot.

Figure 8:
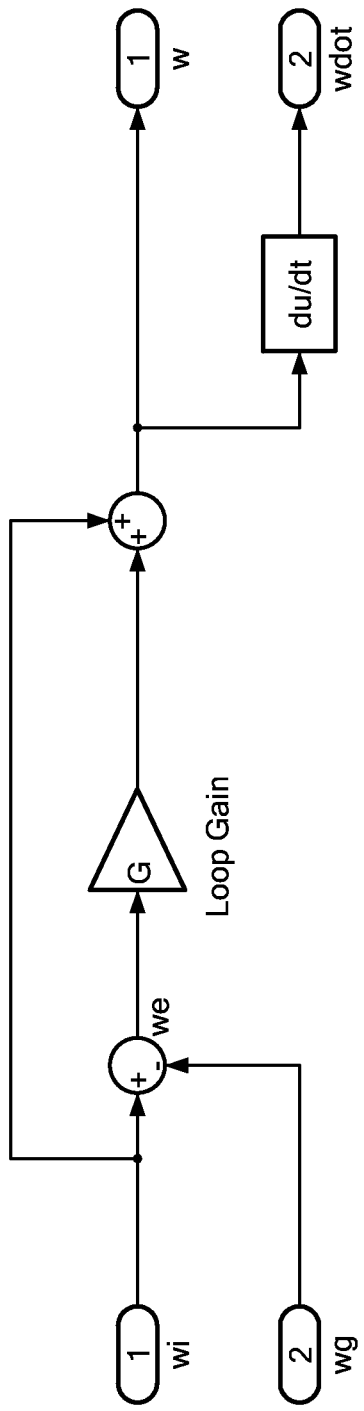

The loop filter could be any filter, depending on user choice, system characteristics and system requirements. FIG. 8 shows the controller where the filter is replaced by a simple loop gain G; due to the decoupling properties of the invention, this has shown to work well. Other choices might be a PID regulator.

Torque applied from disturbances like wind, turbulence etc. will result in the same angular reaction as internal and intended applied torques. Thus, arranging the feedback as in FIGS. 7 and 8 will ensure that the internal applied torques counteract the external disturbances.

Due to the decoupling properties of function F1, the regulator can work on the different axes individually. In other wordsinstead of designing a multiple input multiple output controller, it may be helpful to rather design (or duplicated) more single input single output controllers. This may make design, analysis and test of the controller easier, and may also expands the degree of freedom in the design.

Figure 9:
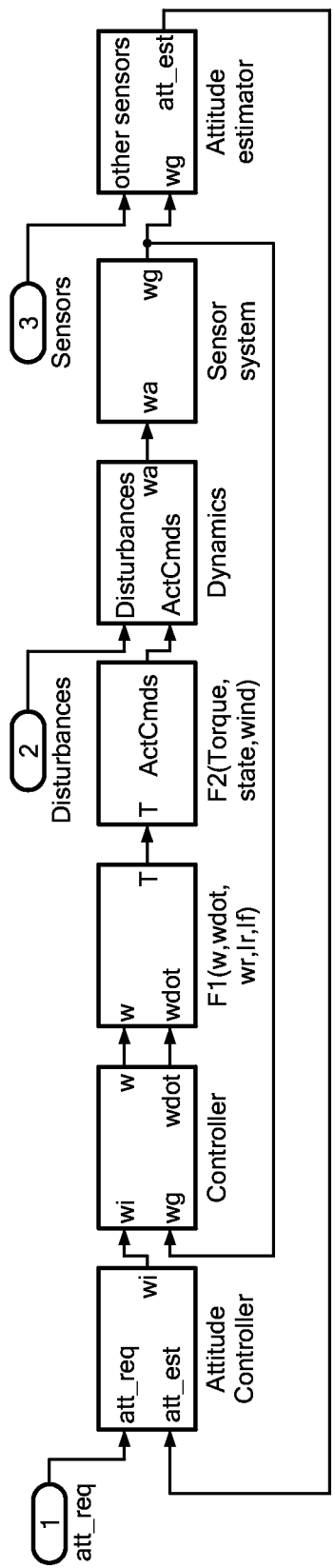
FIG. 9 shows an overall system comprising an embodiment of the present invention where the rate controller is expanded to control attitude instead of angular rate.

In FIG. 9, the controller is expanded to control attitude instead of angular rate. An attitude estimator estimates the roll, pitch and yaw of the aircraft. Attitude can be estimated using different types of mathematics or representation, including euler angles, quaternions or rotational matrixes. Without loss of generality, in the following explanation, euler angles are assumed. Note also that absolute attitude estimation requires input from other sensors than gyros only. This is well known, and not discussed further here.

An outer loop controller takes a requested attitude and the estimated attitude as an input, and outputs a requested angular rate wi.

Figure 10:
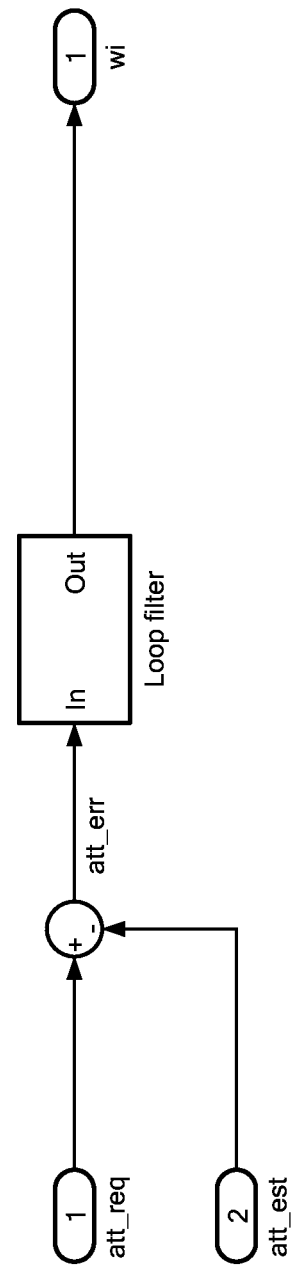
FIG. 10 shows a block diagram of an outer loop controller.

In FIG. 10, the outer loop controller is shown in detail. As for the rate controller, this may consist of independent single input single output controllers. However, there might be some cross coupling in the attitude representation which must be considered. For euler angles, there are such cross coupling, but for small roll and pitch angles this coupling can be neglected. As for the rate controller, loop filters variants may include simple gain, PID controllers or more general filters.

The outer loop can be used together with the rate controller; for lower levels of disturbances, it can be used without the inner rate controller, i.e. as the embodiment shown in FIG. 8, with G set to zero. In low level of disturbances, as the system will follow the commanded input, it is also possible to substitute the measured wf with the required w. This may be required in systems where the instantaneous angular velocity is not known (for example if using an external sensing system outputting only the attitude, not the angular rate), but may also be a usable simplification in other systems.

The advantage of the invention may be an inherent decoupling of the angular roll and pitch movement of a rotary wing aircraft. The principle works in all axes, but for rotary wings aircraft, the coupling is most apparent between the roll and pitch angles, and thus, the invention may improve that coupling the most.

Further, the decoupling makes it possible to independently design controllers of the different axes, using multiple single input single output controllers, and not one more complex multiple input multiple output controller. Using traditional techniques multi-path feedback caused by the coupling (coupling roll to pitch and further back to roll, etc.) will influence stability margins, using the invention the unwanted loops are theoretically broken, in practice very low and can usually be neglected. Overall, the invention may make controller design easier, and more effective controller designs are possible.

What is claimed is:

1. A flight control device outputting actuator steering commands in the yaw, pitch and roll domain from an angular velocity rate control input (wi) controlling a rotary wing aircraft comprising at least one rotor and one fuselage, the flight control device comprising:
   a rate controller deriving requested angular velocity (w) and angular acceleration (wdot) from wi and a measured velocity rate (wg);
   an actuator controller deriving actuator steering commands by an aerodynamic function (F2) being modeled by at least the aerodynamics of the rotary wing aircraft; and
   a torque controller device deriving required torque (T) corresponding to w and wdot by a torque function F1 being dependent of w, wdot, the inertia of the fuselage (If) and the inertia of the rotor (Ir), the torque function device being coupled between the rate controller and the actuator controller, having the outputs w and wdot from the rate controller as inputs and providing T as input to the actuator controller.

2. The flight control device of claim 1, wherein the torque controller device further comprises:
   a first matrix multiplier multiplying If and wdot resulting in a fuselage torque (Tf2) required to achieve one of the requested angular acceleration and motion;
   a first adder adding the angular velocity (wf) of the fuselage and the angular velocity (wr) of the rotor;
   a second matrix multiplier multiplying Ir and the sum of wf and wr resulting in an angular momentum of the rotor (B);
   a cross product multiplier deriving the cross product of w and B resulting a rotor torque (Tr) required to achieve the requested angular velocity; and
   a second adder, adding Tf2 and Tr resulting in T.

3. The flight control device of claim 1, wherein wf is set to wg.

4. The flight control device of claim 1, wherein wf is set to w.

5. The flight control device of claim 1, wherein a sensor system comprising gyros adjusted to sense wg.

6. The flight control device of claim 1, wherein the rate controller further includes:
   a subtractor subtracting wg from wi resulting in a rate error (we);
   a loop gain amplifying we by a function H resulting in Hwe;
   a third adder adding wi and Hwe, resulting in w; and
   a derivator deriving the derivative of w resulting in wdot.

7. The flight control device of claim 1, wherein the actuator controller is adjusted to apply the actuator commands to the rotary wing aircraft.

8. The flight control device of claim 1, wherein an attitude controller deriving wi from an attitude request (att_req) provided by a control device operated by a user and an estimated attitude.

9. A method of flight control for outputting actuator steering commands in the yaw, pitch and roll domain from an angular velocity rate control input (wi) controlling a rotary wing aircraft comprising at least one rotor and one fuselage, the method comprising:

deriving requested angular velocity (w) and angular acceleration (wdot) from wi and a measured velocity rate (wg);

deriving actuator commands by an aerodynamic function (F2) being modeled by at least the aerodynamics of the rotary wing aircraft dependent of the required torque (T) corresponding to w and wdot;

deriving T by a torque function F1 being dependent of w, wdot, the inertia of the fuselage (If) and the inertia of the rotor (Ir); and providing the derived T as input function F2.

10. The method of claim 9, wherein deriving T further includes:

multiplying If and wdot resulting in a fuselage torque (Tf2) required to achieve one of the requested angular acceleration and motion;

adding the angular velocity (wf) of the fuselage and the angular velocity (wr) of the rotor;

multiplying Ir and the sum of wf and wr resulting in an angular momentum of the rotor (B);

deriving the cross product of w and B resulting a rotor torque (Tr) required to achieve the requested angular velocity; and adding Tf2 and Tr resulting in T.

11. The method of claim 9, wherein wf is set to wg.

12. The method of claim 9, wherein that wf is set to w.

13. The method of claim 9, further comprising sensing wg by one or more gyros provided in the rotary wing aircraft.

14. The method of claim 9, wherein deriving w and wdot further includes:

subtracting wg from wi resulting in a rate error (we);

amplifying we by a function H resulting in Hwe;

adding wi and Hwe, resulting in w; and deriving the derivative of w resulting in wdot.

15. The method of claim 9, wherein deriving actuator steering commands further includes applying the actuator commands to the rotary wing aircraft.

16. The method of claim 9, further comprising deriving wi from an attitude request (att_req) provided by a control device operated by a user and an estimated attitude.

\* \* \* \* \*